United States Patent [19]
Brewster

[11] Patent Number: 5,689,420
[45] Date of Patent: Nov. 18, 1997

[54] RANGE SAFETY TRACKING AND DATA PROCESSING SYSTEM

[76] Inventor: Robert J. Brewster, 2107 Cox Rd., Cocoa, Fla. 32926

[21] Appl. No.: 546,608

[22] Filed: Oct. 23, 1995

Related U.S. Application Data

[63] Continuation-in-part of Ser. No. 300,925, Sep. 6, 1994, abandoned.

[51] Int. Cl.$^6$ .............................. H04B 7/185; G01S 5/02
[52] U.S. Cl. ........................... 364/424.06; 364/449.7; 364/516; 102/215
[58] Field of Search .......................... 364/449, 460, 364/424.06, 516, 439, 449.7; 342/357, 76; 340/989, 991; 102/206, 215

[56] References Cited

U.S. PATENT DOCUMENTS

| | | | |
|---|---|---|---|
| 3,414,214 | 12/1968 | Robinson et al. | 244/164 |
| 3,741,501 | 6/1973 | Salkeld | 244/3.14 |
| 4,040,059 | 8/1977 | Simons et al. | 343/203 |
| 4,137,850 | 2/1979 | Donner | 102/215 |
| 4,635,880 | 1/1987 | Jehle | 244/3.14 |
| 4,964,340 | 10/1990 | Daniels et al. | 102/377 |
| 5,153,598 | 10/1992 | Alves, Jr. | 342/352 |
| 5,379,224 | 1/1995 | Brown et al. | 364/449 |
| 5,467,282 | 11/1995 | Dennis | 364/449 |
| 5,519,403 | 5/1996 | Bickley et al. | 342/352 |

OTHER PUBLICATIONS

Eastern Range Operations Directive #4901 Delta II GPS Launch Section 2098; pp. 21–22, 170–174; Aug. 24, 1992.
45th Space Wing Range Safety Operations Requirements [RSOR] Document Eastern Range Flight Test Support FTSS II Orientation 1982; Patrick AFB, Fla.
Test and Evaluation Master Plan For the Range Operations Control Center; Jul. 1992; p. 5; Table 1.1 Rajpo Briefing Dated Jan. 1995.
Commerce Business Daily, Iss. No. PSA–1375; Jun. 16, 1995.
ESMC 2005 Functional Area Requirements and Technology Data; Jul. 24, 1990.

*Primary Examiner*—Michael Zanelli

[57] ABSTRACT

A universal use of the global positioning system [GPS] network that is both low cost and versatile. It can be adapted for use in existing military and commercial missiles. Its modular design makes it extremely useful in various types of missiles and aircraft. The independent tracking system consists of a GPS receiver to collect data from 4 to 6 GPS satellites, computer[s] data processor[s], data transmitter, data receiver and power supply. The GPS satellites are sampled at a high rate to meet user engineering, metric, and Range Safety data requirements. Data are processed using standard least squares fit or Kalman filter data processing algorithms. The resulting EFG EFG or XYZ earth centered time tagged vector is transmitted to a receiving station on the earth's surface or other vehicle.. This type vector was selected because it includes time, is universal, has a standard format, and is easily transmitted. Range Safety requires all their data be time correlated and must be received within a 600 millisecond time frame. The universal vector format allows instant use for tracking instrument drive, Range Safety display and engineering sampling. This greatly reduces current restrictions on delayed data, data format, mission turnaround time and the need for expensive ground data processing workstations. These cost reductions are necessary to keep the U.S. commercial GPS users competitive with those in other countries.

13 Claims, 3 Drawing Sheets

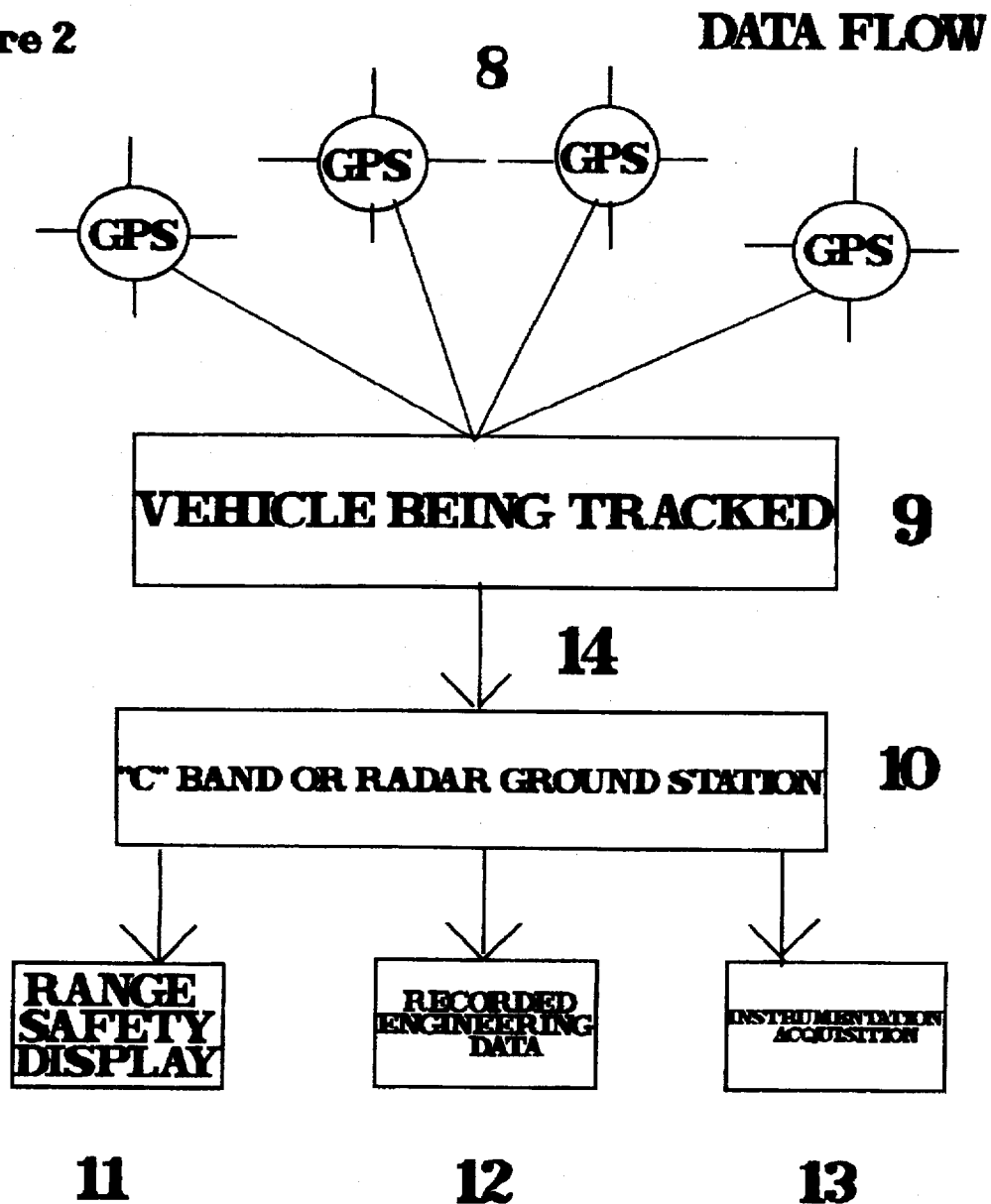

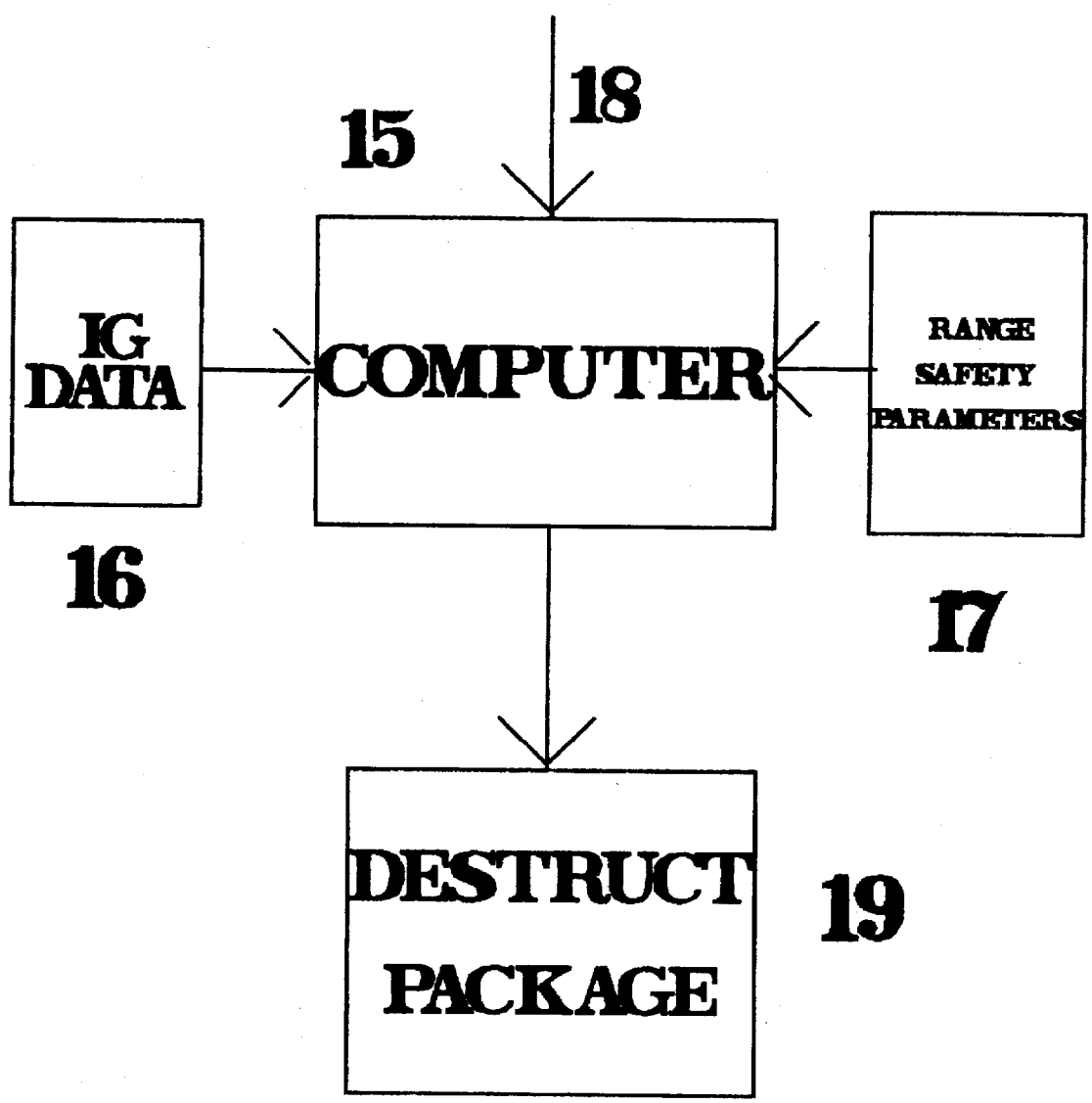

RANGE SAFETY TRACKING AND DATA PROCESSING SYSTEM

This application is a Continuation-in-part of Ser. No. 08/380,925, filed Sep. 6, 1994, now abandoned.

BACKGROUND AND SUMMARY OF THE INVENTION

The invention relates generally to an orbital or sub-orbital missile tracking system that has aircraft applications.

The first use of the GPS constellation in 1977 required a network of remote tracking stations [RRS] and a master range station [MRS]. Synchronization was accomplished with the use of a cesium flying clock physically transported to each station for calibration prior to each mission. Each RRS uplinked for 12 milliseconds, in its respective time slot, once each 100 millisecond. RRS data received at the vehicle being tracked was translated and downlinked to the MRS. GPS L 1 [1575.42 MHz] code data received onboard the vehicle being tracked, is combined with the RRS uplink and translated to telemetry frequencies for downlink to the MRS. At the MRS the RRS signals are combined with the GPS translated telemetry signals to produce a "State" vector for Range Safety input. The process consumed valuable time and shortened Range Safety officer reaction time to protect populated areas. Huge blocks of telemetry downlink bandwidth are needed for this Flight Test Support System. [FTSS] Engineering data, used in the analysis of missile performance, required extensive massaging post mission to correct for delay and atmospheric conditions. This data processing delay lengthened the time between launches.

The FTSS II system eliminated some of the remote stations, reduced data delay and cost. The GPS L1 [1575.42 MHz] and L2 [1227.6] code data, from a minimum of 4 GPS satellites, translated to a "S" band, [2200 to 2800 MHz], telemetry frequency and downlinked. The data is processed at a workstation and corrected for atmospheric conditions the same as FTSS I. The data are then transmitted via microwave to a central computer and used for Range Safety inputs. This system still requires an enormous amount of telemetry bandwidth, does not reduce data delay time substantially and is a high cost system.

These systems are described in prior art in U.S. Pat. No. 4,622,557. This system requires substantial downlink bandwidth and has data delay limitations for Range Safety use.

Another variant GPS receiver is typified by the teachings of U.S. Pat. No. 4,754,283. This system does not provide position data.

U.S. Pat. No. 4,040,059 claims telemetry in the frequency range of 2.2 to 2.3 GHz. Part of a RF multicoupler receives "C" band signals to trigger a "C" band beacon and couples telemetry. This creates a point of multiple failure and is not acceptable by Range Safety. My invention eliminates the "C" band beacon.

A third variant the GPS Tracking System, U.S. Pat. No. 5,379,224, makes no provision for processing functions in the vehicle being tracked. All computations are performed at a earth data processing workstation. This system can not provide the 10 PPS data rate, required by Range Safety, by using the GPS data downlink method. Data gathered by this system does not meet Range Safety requirement of 600 millisecond correlation. The GPS data used by this tracking system requires atmospheric corrections. This system was developed and documented by Interstate Electronics for the Trident Missile and installed at the Eastern Range, Florida in 1980 [FTSS I & FTSS II]. A complete Flight Test Support System orientation manual has been available for public distribution since 1982. This system required 5 telemetry antennas and a data processing workstation. Total station cost was over 80 million dollars.

Range Safety requires two totally independent systems, at a 10 PPS data rate, to make flight safety decisions. Telemetry provides an Inertial Guidance [IG] parameter that originates in the missile and described in prior art U.S. Pat. No. 4,964,340. Radar provides skin echo or "C" band, [5200 to 5800 MHz], beacon parameters. Optical tracking devices provide a third source. Telemetry signals can be received in phase or 180 degrees out of phase depending on when signal lock occurs. For this reason Range Safety requires radar and optics as their two independent sources for the first 30 seconds of missile track. Reference, any Eastern Range Operations Directive [OD]. One example is OD 4901 DELTA II GPS Launch Dated 26 Jul. 1991, section 2098. After telemetry IG data are evaluated and determined to be in the proper phase, IG data replaces the optics data. After optics coverage is lost and prior to final stage burnout, the Range Safety officer depends on radar and telemetry. Telemetry links have failed and Range Safety officers have destroyed missiles that were proceeding on a normal trajectory. Should the Range Safety officer determine the need to send command destruct, a destruct signal, at 416.5 MHz, is transmitted to a destruct package on board the missile. There is only one frequency in use and missile pad checks are often delayed because of a serial operations procedure. Missiles are high cost items and better tracking systems are needed.

U.S. Pat. No. 4,964,340 provides the teachings of an automatic destruct system activated by missile malfunctions, i.e., pitch, roll and yaw. The pyrotechnic unit described controls explosive bolts used in missile stage separation. This self-destruct system is not a Range Safety system. This type destruct is required to break the vehicle into smaller pieces to protect shipping, is not independent and does not meet Range Safety requirements.

Range Safety command destruct relies on land based high and low power transmitters to send the signal to the missile. These stations are strategically placed for most operations. Missiles under development have placed a burden on Range Safety command destruct high power capabilities and new transmitters are being considered. Even if a workable transmitter can be developed, users will still have the desire to launch through areas without command destruct capability. The Pacific and Alaskan missile ranges do not have enough land fixed command destruct stations.

An alternate destruct system known in prior art is described in U.S. Pat. No. 4,137,850 dated Feb. 6, 1979. This is an improvement on previous destruct systems and is hardware only.

The Titan Missile is used to place high inclination objects in orbit. To accomplish this from The Cape Canaveral AFS a North launch azimuth must be used. Under these conditions the missile is under power for 30 seconds after the last ground tracking station's horizon. The program management elected to construct a new station at Argentua, Newfoundland. It consists of a radar, telemetry and command destruct transmitter. The station was added to satisfy Range Safety requirements. The station cost to install and operate is in the millions. The other option was to install GPS FTSS 2 on Titan and use a range tracking ship located in the North sea as the Master Range Station at a cost of $55,000 per day. Also the hull life of the Redstone was short. The ship has been taken out of service.

Several new commercial missiles are in the planning stages. GPS will become the prime tracking device used on missile ranges. A standardized universal data system will save millions in cost and hours of time. For this reason a GPS Range Applications Joint Program Office [RAJPO] located at Eglin, AFB Florida, has been established. The planning is international as well as US..

A problem facing users of the Eglin, White Sands and other missile ranges is the testing of small high velocity missiles. Radar can't provide sufficient data. Current telemetry data transmitters can not be used. They are too large and too heavy. GPS are being considered. A RAJPO briefing dated January 1995 describes an example of the current state of the art GPS tracking system being developed. This system is an earth data processing workstation type system with a installation cost of over 2.6 million.

Commerce Business Daily, Issue No. PSA-1375, dated Jun. 26, 1995, describes another example of current state of the art GPS development. This is also an earth data processing workstation type station. Potential sources are being sought to update all missile ranges to include current GPS technology.

BRIEF DESCRIPTION OF THE DRAWINGS

FIG. 2 is a data flow diagram.

FIG. 3 is a automatic destruct package

DETAILED DESCRIPTION OF THE INVENTION

Figure 1:
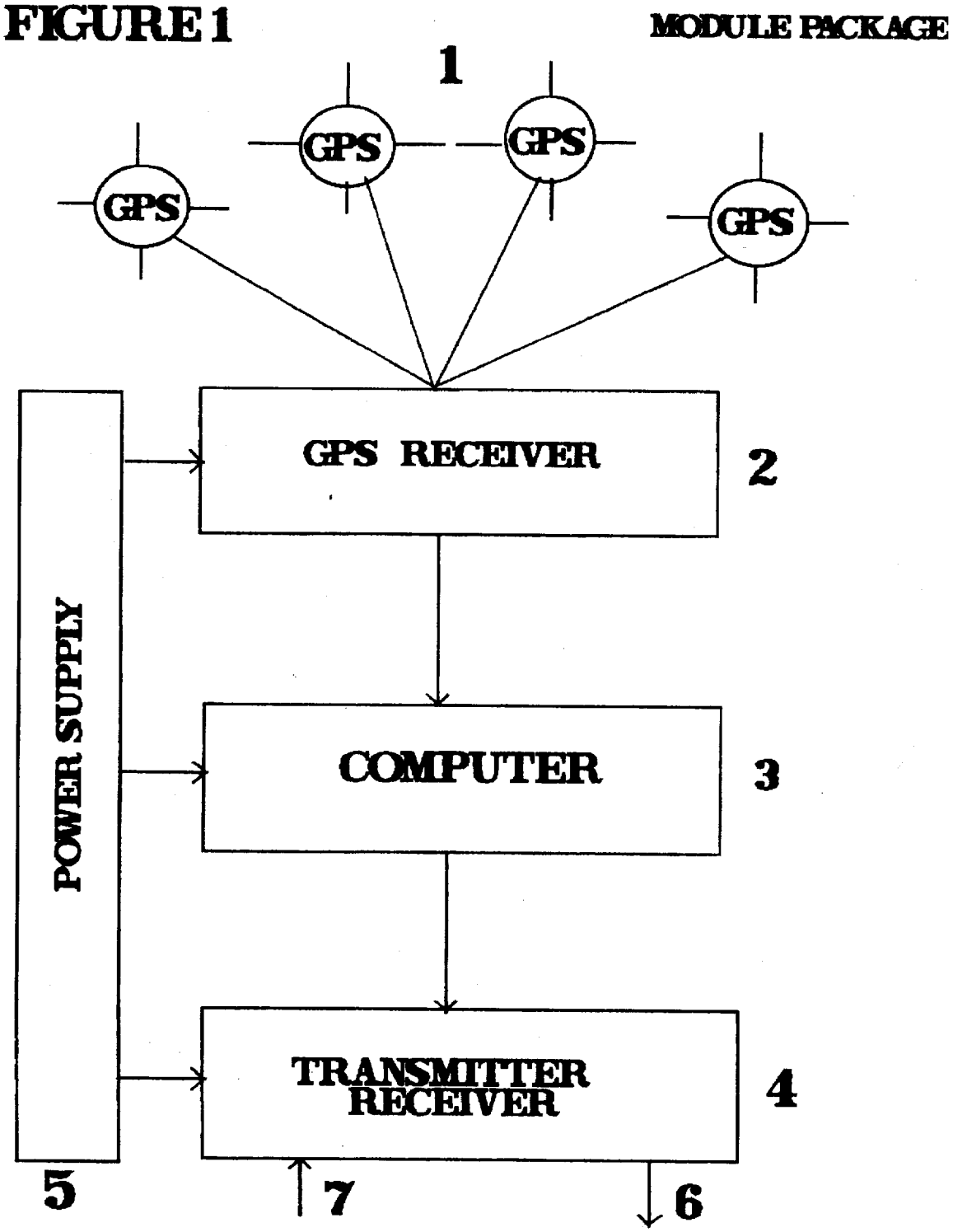
FIG. 1 is a block diagram of the total modular unit.

The present invention is designed to provide Range Safety with a low cost independent data source. It satisfies all the current Range Safety requirements as an independent source with no single point of failure. By providing another source for Range Safety, the dependencies on telemetry data are reduced. All computations are performed onboard the vehicle being tracked. This reduces the delay of getting the data to Range Safety and increases the accuracy.

The invention consists of a circuit board with modular construction to provide versatility. [FIG. 1] Each unite has a separate independent power supply. [5] The main module is a GPS receiver [2] that samples 4 or more GPS satellites [1] at a high sample rate. [Currently up to 10 PPS] The computer module[s] [3], process the data using standard least squares or Kalman filter data processing algorithms. The final product is a stream of EFG EFG or XYZ earth centered vectors downlinked [6] to the radar or other "C" band station. The accuracy is only limited to the allowable GPS data link. When computations are done outside the earth's atmosphere, atmospheric corrections are not required. The position accuracy can be less than 10 mtrs. Each vector has a time tag of when the data was sampled. Each vector contains the position, velocity and time of the vehicle being tracked. The data is transmitted by the transmitting module [4] on a continuos FM/FM link or a PDM/PCM/FM/FM link. The data are transmitted in the "C" band frequency range. More data can be transmitted on a "C" band link because of more bandwidth available. Engineering data may be multiplexed with solution data. The data are received, recorded and distributed at a "C" band receiver or radar station.

The transmitter-receiver module [4] will have the capability of being commanded by a "C" band radar uplink. [7] This feature can save power when used to turn the module on or off.

"C" band radar's are "On Axis" drives and have the capability to track a continuos wave signal as well as a monopulse return. This means recording data in a passive mode or non interference mode while the radar is in a active skin tracking mode on the same target. Or tracking in a passive mode without the radar transmitting. On axis systems compute a vector from data received and use the vector to drive a servo system thus providing a smooth track. The vectors from this system can be used in place of radar produced vectors when tracking in a passive mode. The EFG vectors downlinked [14] are received and decomutated. The "C" band radar's have at least two data receiving channels. One channel can be assigned to the radar for monopulse operation on echo skin track and another to the CW downlink. After the vector stream is decommutaded the vector data is already in the proper format for use by the Range Safety system [11]. No workstation or further data processing are required. The data are in the same format used to drive all world wide tracking systems [13] for acquiring orbiting vehicles. The data are in the proper format for communicating with computers at the various ranges. The universal format allows communication with foreign users. Engineering data are recorded at the "C" band or radar ground station. [12] [10]

The present cost of a data processing module, less antennas, is $4000 to $7000. Most medium and large launch vehicles in use today carry a "C" band antenna and some are equipped with a GPS antenna. This invention can be placed in current hardware without major redesign. By using 10 PPS data, the "jerk" problem experienced with high velocity vehicles is minimized. The entire modular package weighs a few ounces. A "C" band beacon weighs about three pounds.

A second computer module [15] may be added for an automatic destruct [FIG. 3]. Inertial Guidance [IG] data [16] and Range Safety parameters [17] are combined with the vectors [18] computed by computer [3] [FIG. 1]. If the Range Safety parameters are violated a signal is transmitted to a destruct package [19]. The advantages over current systems U.S. Pat. No. 4,964,340 are, Range Safety can perform systems checks while the vehicle is still on the pad. High power command transmitters are not needed. Removes the limitation of only one command destruct frequency available. This system can provide a command destruct system that can't be jammed and is not susceptible to extraneous signals triggering a false destruct.

This invention is low cost, has universal application, adaptable to existing hardware, and extends the present capability of current missile tracking instrumentation. Eliminates the need for expensive ground processing workstations, improves the command destruct capabilities, and decreased missile turnaround times. Provides another source with backup for telemetry engineering data. This invention will standardize GPS data use with universal data formats. Range Safety systems, that haven't been updated for 30 years, are updated and the cost of launching a vehicle into space is reduced.

GLOSSARY

EFG EFG Earth centered vector containing position, velocity and time.

FTSS I Flight Test Support System.

FTSS II Flight Test Support System update.

Jerk Data points that step.

OD Operations directive at the Eastern Range.

GPS Global positioning system.

MRS Master range station, a part of the FTSS. Project name for a "Workstation"

RRS Remote range station a part of the FTSS.
RSOR Range safety operations document.
Turn around time The time it takes for the Range to complete support on one operation and start another.
XYZ Earth centered vector that is in the x,y, and z coordinate system.

I claim:

1. A system for providing status information of an airborne vehicle to control flight, initiate destruct commands, and provide data to ground stations, said system comprising:
   a receiver on board said airborne vehicle for receiving navigation signals from global positioning satellites (GPS);
   at least one computer on board said airborne vehicle, connected to said receiver and interfaced with preexisting on board computers, sensors, and data packages, for determining status information of said airborne vehicle and formatting said status information into EFG EFG earth centered coordinates; and
   a "C" band transceiver on board said airborne vehicle and connected to said at least one computer for transmitting said formatted status information to a ground station.

2. The system of claim 1, wherein said status information includes position, velocity, and time data.

3. The system of claim 1, wherein said formatted status information received by the ground station is used for at least one of analysis, instrumentation acquisition, display, recordation, and destruct initiation.

4. The system of claim 1, wherein said airborne vehicle further includes an on board destruct package.

5. The system of claim 4, wherein said at least one computer determines whether said status information indicates a need for transmitting a hard wired destruct command to said on board destruct package.

6. The system of claim 4, wherein said ground station further includes a Range Safety device for transmitting a destruct command to said on board destruct package.

7. The system of claim 1, wherein said "C" band transceiver is capable of being actuated from a ground station.

8. The system of claim 1, wherein said ground station includes a "C" band type radar capable of active or passive tracking of one or more targets.

9. The system of claim 1, wherein said airborne vehicle further includes an on board Inertial Guidance (IG) means for providing position and velocity data, and said at least one computer combines the GPS and IG data to provide two independent sources of position and velocity information.

10. A method for providing status information of an airborne vehicle to control flight, initiate destruct commands, and provide data to ground stations, said method comprising:
    receiving navigation signals from global positioning satellites (GPS);
    determining status information of said airborne vehicle based on the received GPS signals and data obtained from on board computers, sensors, and data packages;
    formatting the status information into EFG EFG earth centered coordinates; and
    transmitting the formatted status information to a ground station using a "C" band data link.

11. The method of claim 10, wherein the airborne vehicle includes an Inertial Guidance (IG) means, said method further comprising:
    combining said GPS navigation signals and signals generated by the IG means to provide two independent sources of position and velocity data.

12. The method of claim 10, wherein the airborne vehicle includes a destruct package, said method further comprising:
    initiating a hard wired destruct command if a need to destruct is indicated by the determined status information.

13. The method of claim 10, wherein the airborne vehicle includes a destruct package, said method further comprising:
    transmitting a destruct command from a Range Safety device located at a ground station via said "C" band data link.

* * * * *